L. E. WATERMAN.
SEEDING MACHINE.
APPLICATION FILED APR. 11, 1911.

1,042,990.

Patented Oct. 29, 1912.
2 SHEETS—SHEET 1.

Witnesses:
E. Behel
G. Southworth

Inventor:
Lewis E. Waterman
By A. O. Behel
Atty.

L. E. WATERMAN.
SEEDING MACHINE.
APPLICATION FILED APR. 11, 1911.

1,042,990.

Patented Oct. 29, 1912.
2 SHEETS—SHEET 2.

Witnesses:
E. Behel
G. Southworth

Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

SEEDING-MACHINE.

1,042,990.

Specification of Letters Patent. Patented Oct. 29, 1912.

Application filed April 11, 1911. Serial No. 620,422.

*To all whom it may concern:*

Be it known that I, LEWIS E. WATERMAN, a citizen of the United States, residing at Rockford, in the county of Winnebago and State of Illinois, have invented certain new and useful Improvements in Seeding-Machines, of which the following is a specification.

The object of this invention is to construct a seed coverer for seeding machines, and especially applicable to listers.

Figure 1:
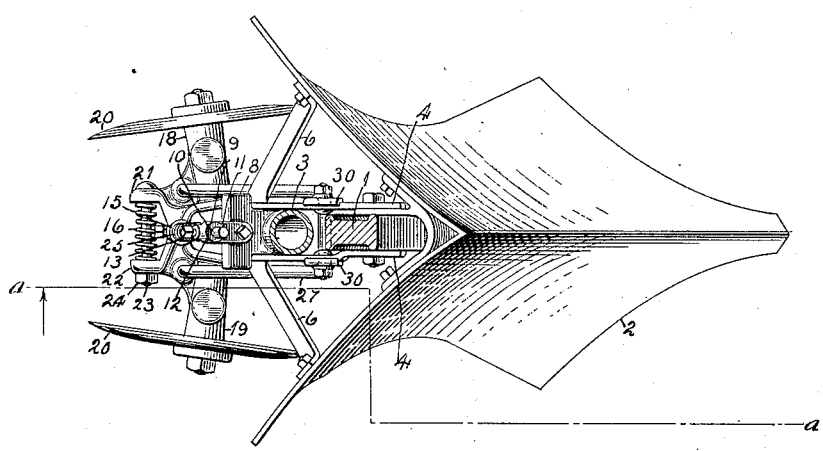
Figure 2:
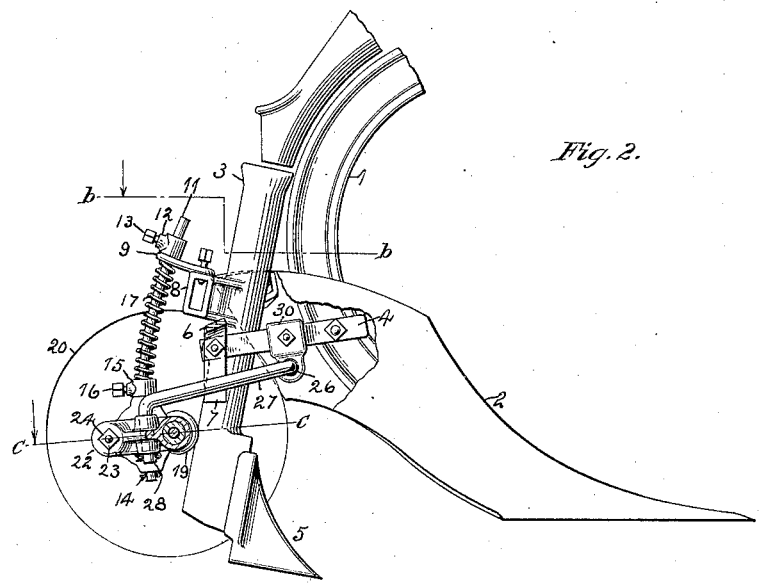
Figure 3:
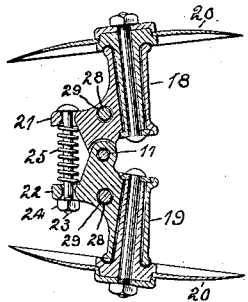
Figure 4:
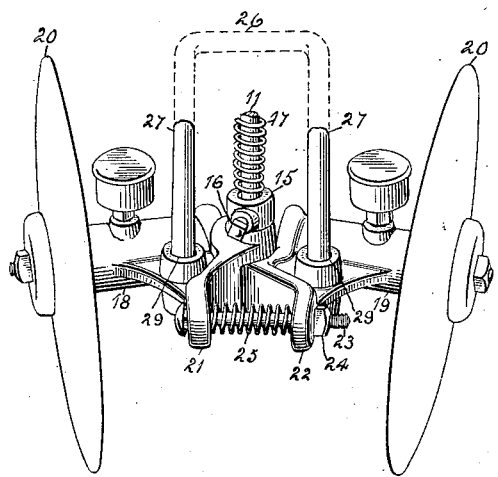

In the accompanying drawings, Figure 1 is a section on dotted line $b\ b$ Fig. 2. Fig. 2 is section on dotted line $a\ a$ Fig. 1. Fig. 3 is section on dotted line $c\ c$ Fig 2. Fig. 4 is a rear view of the coverer.

In the drawings, I have not shown a complete lister as my improvements have only to do with the coverer which is attached to the plow beam.

The plow beam 1 has a plow 2 attached to its lower end. A seed tube 3 is connected to the plow beam by the braces 4 and has a furrow opener 5 attached to its lower end. Braces 6 connect the braces 4 with the mold boards of the plow, and are provided with depending ends 7. From the seed tube 3 extends a projection 8, and to this projection is secured a bar 9 provided with a vertical opening 10. A rod 11 is located in the opening 10, and has a collar 12 connected to its upper end by the set screw 13. A pin 14 is located in an opening in the lower end of the rod 11, and a collar 15 is connected to the rod 11 by the set screw 16. A coiled spring 17 surrounds the rod 11 and is located between the collar 15 and the bar 9. Between the collar 15 and the pin 14 are located two disk supports or carriers 18 and 19, each supporting a disk 20 in a manner to permit it to revolve in connection therewith. From the disk supports 18 and 19 extend perforated extensions 21 and 22 respectively, and a bolt 23 is located in the perforations receiving a nut 24 on its screw-threaded end outside of the extension 22. A coiled spring 25 surrounds the bolt 23 and is located between the extensions 21 and 22.

A connection is formed between the disk supports and the braces 4 by the employment of a yoke comprising the end 26, side sections 27 and depending ends 28. The depending ends 28 are located in openings 29 in the disk supports 18 and 19. The side sections 27 are sufficiently resilient to permit the disk supports to swing on the pivot 11. The end section 26 is supported by brackets 30 secured to the braces 4.

The disks 20 are located on each side of the furrow opener 5 and set to throw the earth toward the center. The disks and their supports are vertically movable through the yoke connection with the brackets 30, and the spring 17 will hold the disks down with the necessary pressure to enable them to enter the ground.

The side sections 27 of the yoke move in contact with the depending ends 7 of the braces 6, which will prevent lateral movements of the disk supports. By the employment of the spring 25, the disk supports have a yielding movement laterally with respect to one another.

I claim as my invention.

1. In a seeding machine, the combination with a support, of a pair of disk carriers pivotally mounted on the support, covering disks journaled on the disk carriers, on a substantially upright axis, and a yielding connection between the disk carriers.

2. In a seeding machine, the combination with a support, of a pair of disk carrier pivotally mounted on the support on a common axis, covering disks journaled on the disk carriers, and a spring interposed between the disk carriers and bearing against the same.

3. In a seeding machine, the combination with a support, of a pair of pivotally connected disk carriers, covering disks journaled on the carriers, and a spring interposed between and bearing against the carriers to urge the same apart.

4. In a seeding machine, the combination with a support, of a pair of swinging disk carriers, a pivot for the carriers on which they have a sliding up and down movement, a spring on the pivot bearing against the carriers, and disks mounted on the carriers.

5. In a seeding machine, the combination with a support, of a pair of swinging disk carriers, a pivot for the carriers on which they have a sliding up and down movement, a spring on the pivot bearing against the carriers to urge them downwardly, a spring interposed between the disk carriers to urge the same apart, and disks mounted on the carriers.

6. In a seeding machine, the combination with a support, of a pair of swinging disk carriers, a pivot for the carriers carried by the support, said carriers being slidable upon the pivot, a spring bearing upon the carriers to urge the same downwardly, a yoke pivoted to the support and having arms engaged with the carriers, said yoke permitting the up and down play of the carriers on the pivot, and disks journaled on the carriers.

7. In a seeding machine, the combination with a support, of a pivot carried thereby, a pair of disk carriers journaled on the pivot and slidable thereon, a vertically swinging yoke having arms directly engaged with the carriers, a spring mounted on the pivot and bearing against the carriers to urge them downwardly, a spring interposed between the carriers, and disks journaled on the carriers.

In testimony whereof I have hereunto set my hand in presence of two subscribing witnesses.

LEWIS E. WATERMAN.

Witnesses:
A. O. BEHEL.
E. D. E. N. BEHEL.

Copies of this patent may be obtained for five cents each, by addressing the "Commissioner of Patents, Washington, D. C."